(12) United States Patent
Johansson et al.

(10) Patent No.: US 6,757,065 B1
(45) Date of Patent: Jun. 29, 2004

(54) METHOD OF DETERMINING AN ILLUMINATED SURFACE

(75) Inventors: Per-Ake Johansson, Stockholm (SE); Peter Hansson, Bromma (SE)

(73) Assignee: STFI, Stockholm (SE)

( * ) Notice: Subject to any disclaimer, the term of this patent is extended or adjusted under 35 U.S.C. 154(b) by 0 days.

(21) Appl. No.: 09/890,056

(22) PCT Filed: Jan. 10, 2000

(86) PCT No.: PCT/SE00/00024

§ 371 (c)(1),
(2), (4) Date: Jan. 8, 2002

(87) PCT Pub. No.: WO00/45125

PCT Pub. Date: Aug. 3, 2000

(30) Foreign Application Priority Data

Jan. 28, 1999 (SE) .............................................. 9900276

(51) Int. Cl.[7] .......................... G01N 21/55; G01N 21/47
(52) U.S. Cl. ...................................... 356/446; 356/445
(58) Field of Search ................................. 356/446, 661, 356/602, 603, 604, 605; 250/237.2, 559.23; 382/154

(56) References Cited

U.S. PATENT DOCUMENTS

| | | | |
|---|---|---|---|
| 4,162,126 A | 7/1979 | Nakagawa et al. | ......... 356/237 |
| 5,311,286 A * | 5/1994 | Pike | ........................... 356/605 |
| 5,463,464 A * | 10/1995 | Ladewski | ..................... 356/601 |
| 5,465,153 A * | 11/1995 | Ladewski | ..................... 356/601 |
| 5,835,190 A | 11/1998 | Miyake | ....................... 351/212 |
| 5,894,348 A * | 4/1999 | Bacchi et al. | ................ 356/370 |
| 5,930,383 A * | 7/1999 | Netzer | ......................... 382/154 |
| 6,522,777 B1 * | 2/2003 | Paulsen et al. | ............... 382/154 |
| 6,549,288 B1 * | 4/2003 | Migdal et al. | ............... 356/603 |
| 6,552,783 B1 * | 4/2003 | Schmidt et al. | ........... 356/237.4 |

FOREIGN PATENT DOCUMENTS

| | | |
|---|---|---|
| EP | 0764846 | 3/1997 |
| JP | 60135704 | 7/1985 |
| JP | 61082106 | 4/1986 |
| JP | 61198009 | 9/1986 |
| WO | Wo 98/36240 | 8/1998 |

* cited by examiner

Primary Examiner—Michael P. Stafira
(74) Attorney, Agent, or Firm—Wood, Herron & Evans, L.L.P.

(57) ABSTRACT

Method of determining a surface illuminated by incident light. First the intensity ($I_1(x,y)$) of light reflected from the surface is recorded in a first image of the surface. After this, the intensity ($I_2(x,y)$) of light reflected from the surface is recorded in a second image of the surface, taken at a different angle of illumination. Only the diffusely reflected light is recorded. The difference between the recorded intensities of the first and the second images is determined to obtain a representation that emphasizes variations in gradient of the surface. This representation is further processed by signal-adapted integration to a topographic description, that is, a height function of the surface.

22 Claims, 5 Drawing Sheets

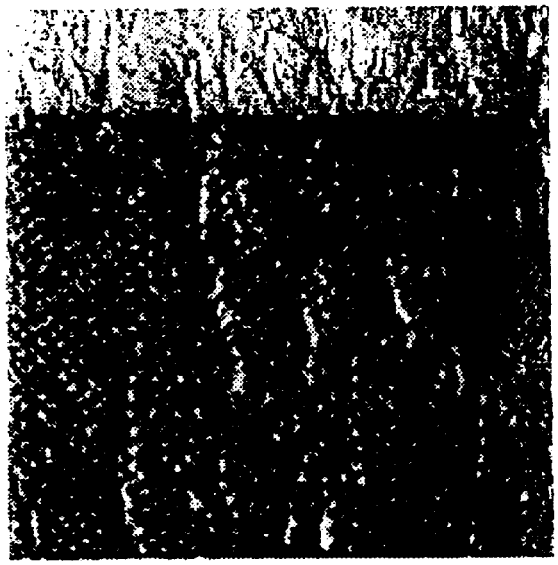 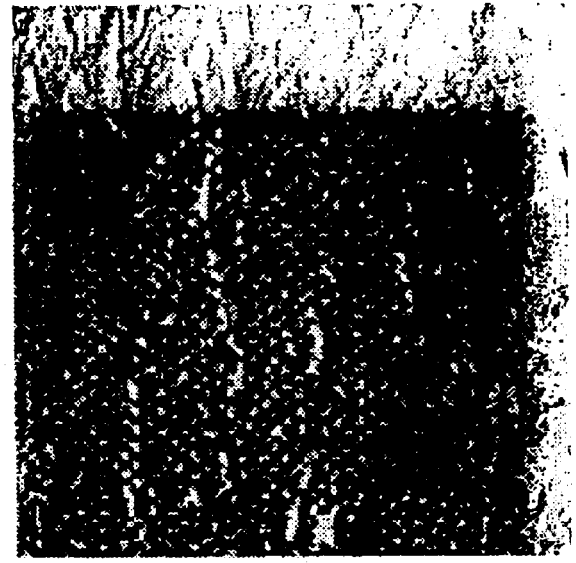
FIG.4A  FIG.4B
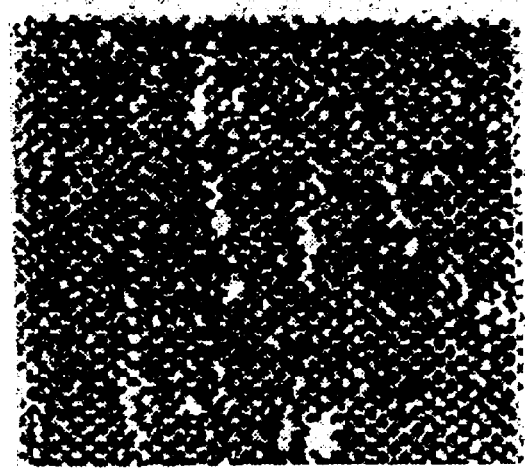
FIG.5

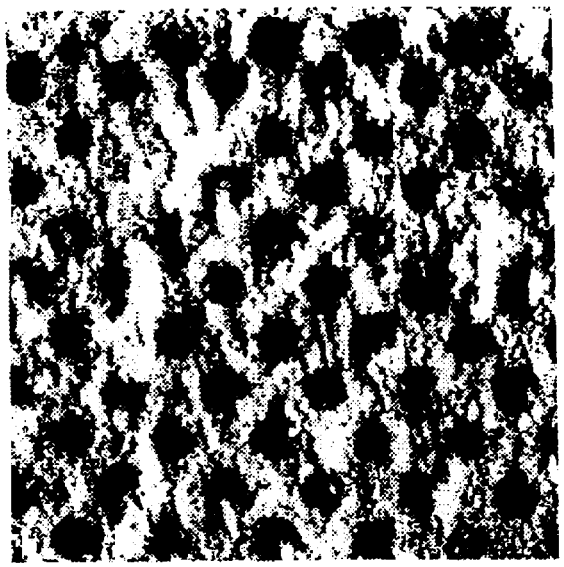
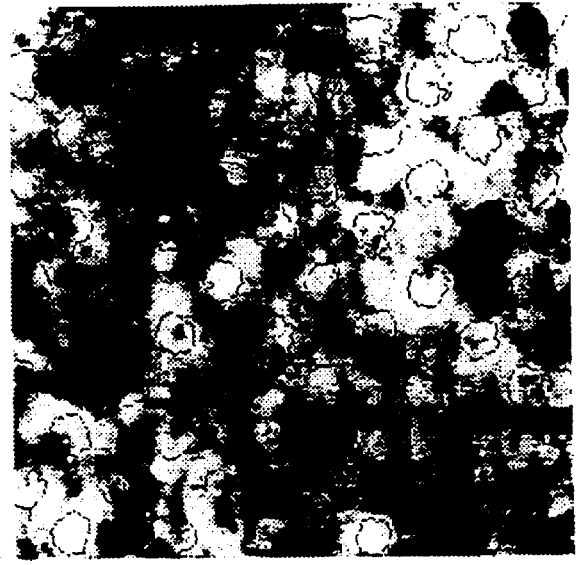
FIG.9A          FIG.9B
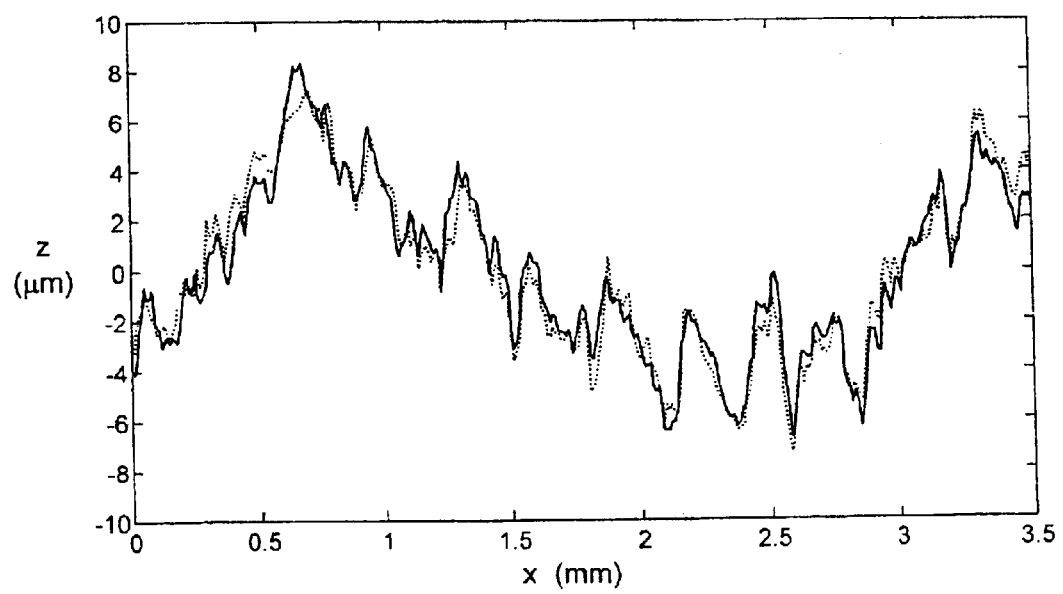
FIG.10

METHOD OF DETERMINING AN ILLUMINATED SURFACE

TECHNICAL AREA

The present invention relates to a method of determining a surface illuminated by incident light by recording the intensity of light reflected from the area in a first image thereof and recording the intensity of light reflected from the area in a second image thereof, complementary to the first image, taken with another angle of illumination.

The invention is particularly but not exclusively applicable to paper surfaces intended for the application of print.

THE PRIOR ART

SE 508 822 makes known a method and a device for measuring and quantifying surface defects, such as polishing roses that can occur in connection with the polishing of coated sheet metal items. In this method and device, at least two sub-images are recorded with at least one camera under illumination of the test surface with parallel light or light from a point source, whereby the angles of incidence of the light relative to the test surface and/or the camera are different during the recording of different sub-images, after which the sub-images are processed in at least one central unit. After this, one or several difference images of the sub-images are produced, and used to determine the degree of surface defects on the test surface. This known technique, however, provides no guidance in how the recorded sub-images can be used in order to determine the topography of the surface.

DESCRIPTION OF THE INVENTION

An object of the present invention is to provide a photometric method of the type described in the introduction that can rapidly determine the topography of a surface. According to an aspect of the invention, the intensity (that is, the power per unit area) only of diffusely reflected light is recorded in the two images, and a difference between the recorded intensities of the diffusely reflected light of the first and the second recorded images is determined, in order to obtain a representation of the gradient variations of the surface.

If the difference is normalized by division by the sum of the intensities, a ratio is obtained that is essentially directly proportional to the local derivative of the surface.

The derivative in turn is used to determine the height function of the surface.

The insight that forms the basis of the invention is that the lightness of a topographic surface element depends both on its diffuse reflectance and on its angle relative to the illumination. If images of the surface are taken with different angles of illumination, these will differ due to the topography of the surface, but not due to differences in its diffuse reflectance. This can, according to the invention, be used in image processing operations that distinguish the topography from the reflectance.

BRIEF DESCRIPTION OF DRAWINGS

The invention is described in more detail with reference to the attached drawings, in which

FIGS. 4A and 4B show images of a deeply printed test surface recorded by illumination from the left and from the right of the arrangement according to FIG. 1;

FIG. 5 shows the reflectance of the test surface according to FIG. 4;

FIGS. 9A and 9B show at a higher scale a reflectance image and a topographic image, respectively, of a test surface furnished with printed points; and FIG. 10 shows profiles of a test surface measured mechanically and measured with an arrangement according to the invention.

DESCRIPTION OF AN EMBODIMENT

Figure 1:
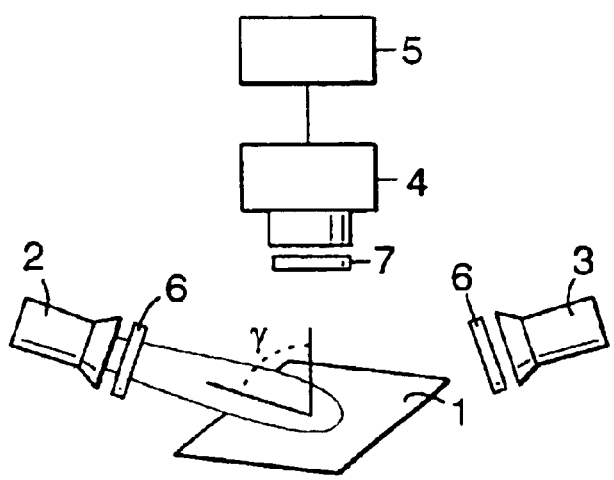
FIG. 1 shows schematically an arrangement for recording images according to the invention.

The principle of the invention is shown in the arrangement according to FIG. 1. A test surface 1, which in the examples described is a paper surface with an area typically of 5×5 mm, is illuminated by a first light source 2 and by a second light source 3 arranged at two mutually opposite directions. The light sources 2, 3 contain halogen lamps with illumination optics. A camera 4 of CCD type detects and records by a computer 5 the intensity of the reflected light.

The computer 5 is preferably equipped with known hardware and software for image processing. The time required for analysis of an image with a resolution of 512×512 pixels is currently approximately 10 seconds using a 400 MHz standard PC. The mathematical analysis has been carried out using the MATLAB® software.

The invention is based on the detection of diffuse light. Specular reflections from the test surface can be eliminated in the example shown by means of mutually crossed polarizers 6 and 7. In more detail, a polarizer 6 can be placed between the test surface 1 and each light source 2, 3, while a polarizer 7 that is crossed with respect to the polarizer 6 can be placed between the test surface 1 and the camera 4, in such a way that the illuminating light is polarised parallel to the incident plane and the reflected light is polarised at right angles to it.

Figure 2:
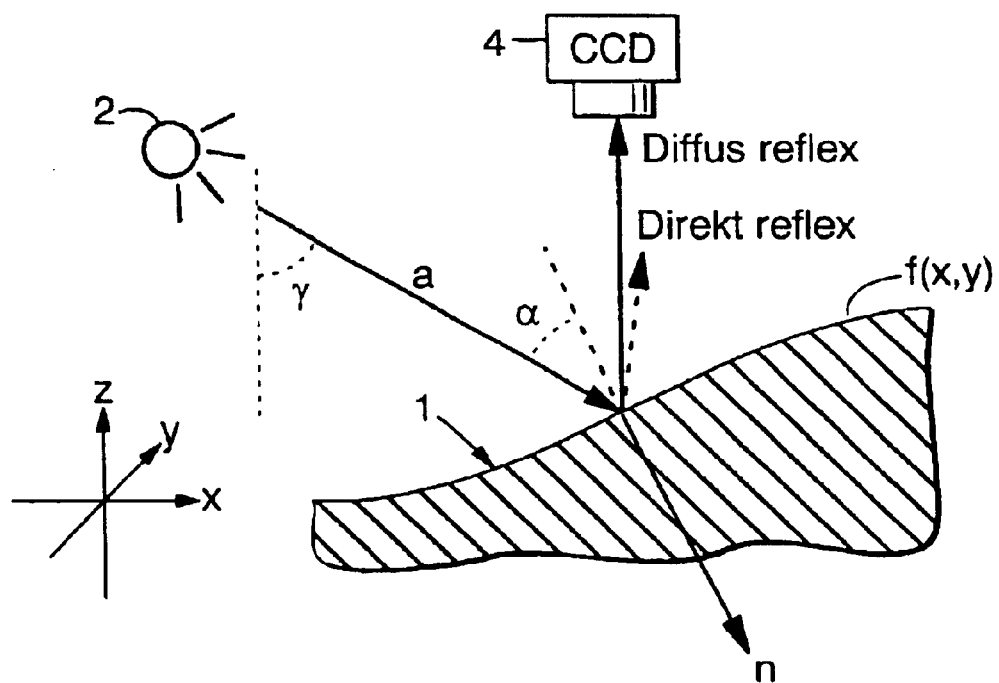
FIG. 2 shows a model corresponding to FIG. 1 that forms the basis for processing the recorded images.

With reference to FIG. 2, the intensity of the incident light is proportional to $\cos(\alpha)$, where $\alpha$ is the angle of incidence of the illuminating light to the surface 1. Lambert's law is assumed to be valid for the diffusely spread light. According to this law, the radiance is equal in all directions. This means that the intensity detected by the camera is given by $$I = I_0 \, R \cos(\alpha) \quad [1]$$

where R is the reflectance and $I_0$ is the intensity measured when $R=1$ and $\cos(\alpha)=1$. Scalar multiplication gives a value for $\cos(\alpha)$ as $$\cos(\alpha) = a \cdot n / |n| = \frac{\sin(\gamma) \frac{\partial f}{\partial x} + \cos(\gamma)}{\sqrt{\left(\frac{\partial f}{\partial x}\right)^2 + \left(\frac{\partial f}{\partial y}\right)^2 + 1}} \quad [2]$$

where a is the illumination vector $[\sin(\gamma), 0, -\cos(\gamma)]$ and n is the surface normal $[\partial f/\partial x, \partial f/\partial y, -1]$.

If two images, $I_1$ and $I_2$, are recorded with $\gamma_2=-\gamma_1$, FIGS. 4A, 4B, the partial derivative $\partial f/\partial x$ can be calculated from [1] and [2] as $$\frac{\partial f}{\partial x} = \frac{1}{\tan\gamma} \cdot \frac{I_1 - I_2}{I_1 + I_2} \quad [3]$$

Figure 6:
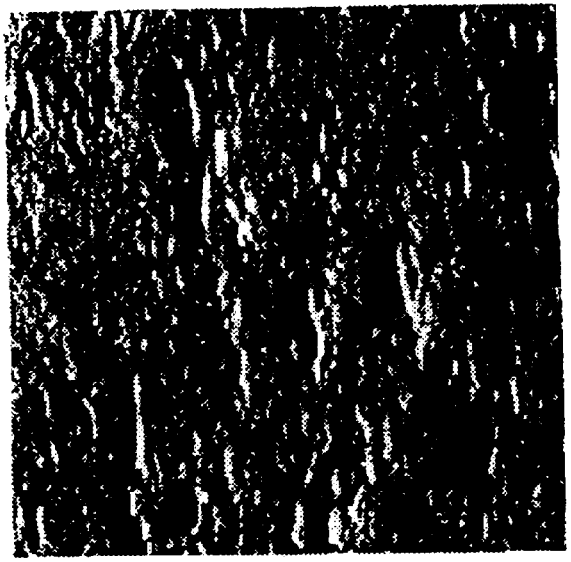
FIG. 6 shows the derivative of the test surface in FIG. 4.

This expression does not depend on the reflectance. An example of the derivative, calculated from the images in FIGS. 4A, 4B, is shown in FIG. 6, in which the derivative has been coded as a grey-scale image.

Figure 7:
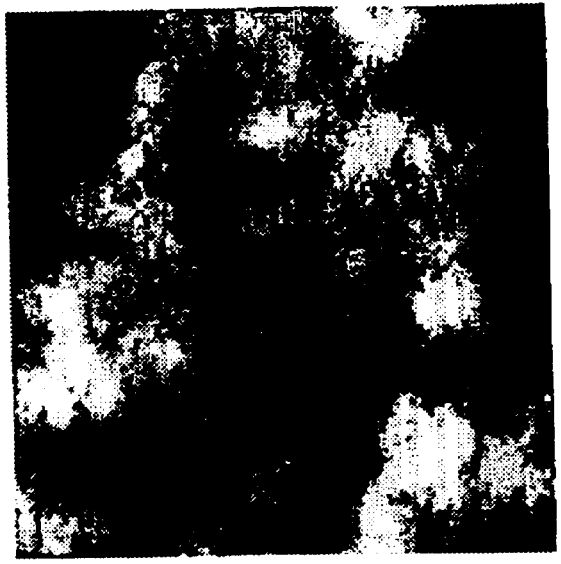
FIG. 7 shows the topography of the test surface in FIG. 4.

In order to obtain the height function of the test surface, the derivative must be integrated. However, since the images contain noise, certain spatial frequencies must be integrated with caution. This is why the derivative should preferably be subjected to a Fourier transform and multiplied by what is know as a Wiener filter:

$$H_R = \frac{H_1^*}{|H_1|^2 + SNR(u,v)^{-1}}$$

which performs the integration with the suppression of spatial frequencies u and v, which have an expected low signal-to-noise ratio, SNR. The frequencies $H_1$ of the surface include both the partial derivative (in the form of $2\dot{m}u$) and the light that is spread in the material. For more detailed description of a Wiener filter, refer to Pratt, W. K. (1978), Digital Image Processing, Wiley, New York, 378–387. The surface function, which is shown in FIG. 7, also coded as a grey-value image in which lower surface areas have a darker grey value than higher surface areas, is obtained as the inverse transform of the product.

The local reflectance of the test surface, which provides information about the degree of covering of the print, is approximately obtained as the sum of the images, $I_1$ and $I_2$, see FIG. 5.

Figure 3:
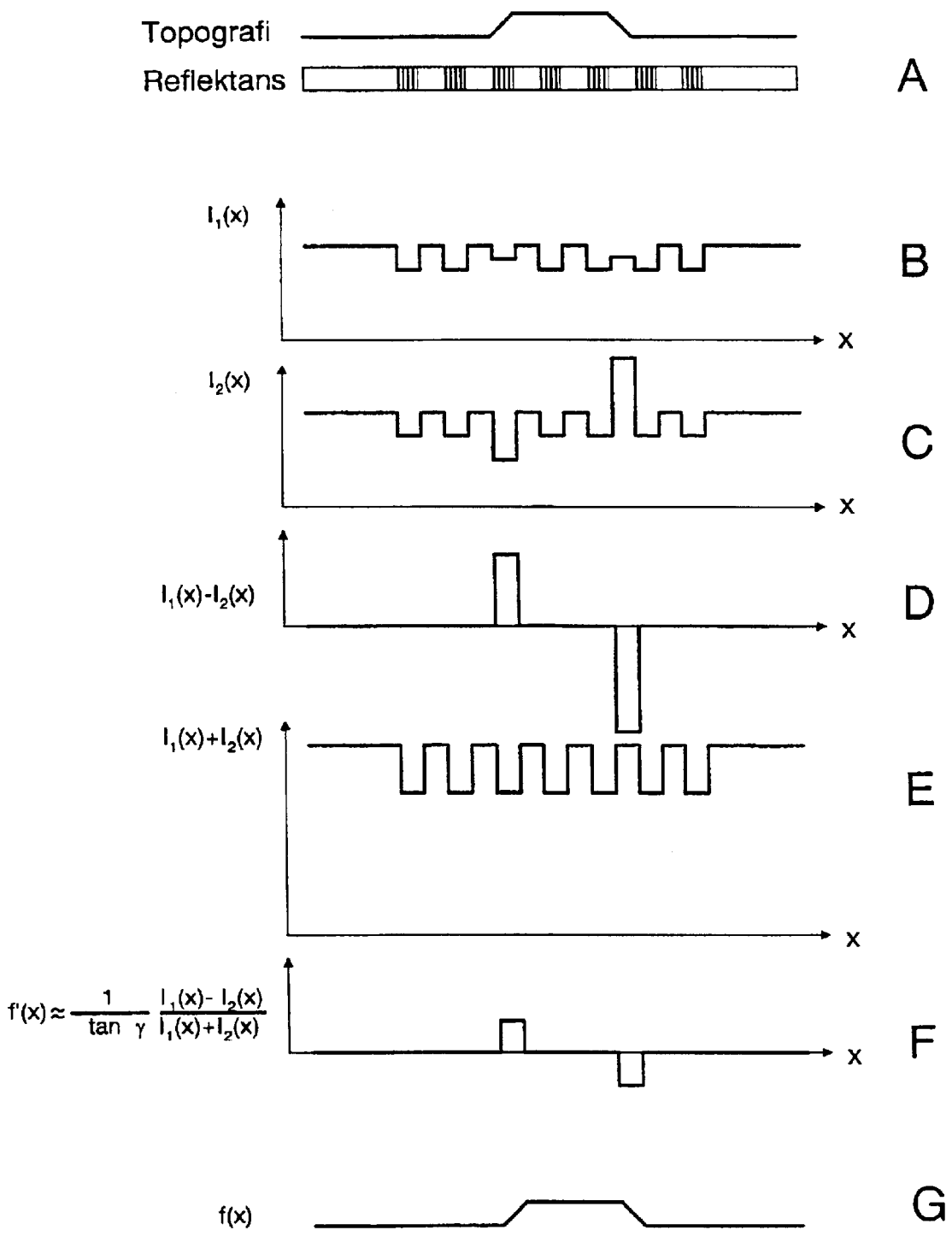
FIG. 3 shows in the form of a diagram a simplified example of processing a recorded image according to the invention.

In order to facilitate understanding of the invention, a simplified one-dimensional "digital" observation of a typical image processing operation is shown in FIGS. 3 A–G.

FIG. 3A shows the test surface, the topography of which, f(x), is to be investigated. In this case the surface has a printed regular pattern.

When the surface is illuminated with oblique illumination from the left, an intensity variation in the diffusely reflected light is obtained, according to FIG. 3B, as a result of variations both in the reflectance (the pattern) and in the topography. Compare also the equivalent image or graphical representation in the two-dimensional case according to FIG. 4A, in which variations in grey-value are equivalent to variations in intensity.

When the surface is illuminated with oblique illumination from the right, a new intensity variation, $I_2(x)$, in the diffusely reflected light is obtained in an equivalent manner, according to FIG. 3C. Compare also the equivalent image in the two-dimensional case according to FIG. 4B.

If the difference between the intensities, $I_1(x)-I_2(x)$, is calculated, a variation which accentuates the topographic variations is obtained, according to FIG. 3D (the variations in reflectance are partially, but not wholly, suppressed), that is, variations in the gradient of the surface.

If the sum of the intensities, $I_1(x)+I_2(x)$, is calculated, a variation that essentially depends only on variations in reflectance is obtained according to FIG. 3E, while the structural or topographical variations are suppressed. In other words, the distribution of color on the surface is obtained, that is, the presence or absence of print. Compare also the equivalent image in the two-dimensional case according to FIG. 5.

If the ratio $(I_1(x)-I_2(x))/(I_1(x)+I_2(x))$ is calculated, that is, the normalized difference between the intensities, a variation is obtained according to FIG. 3F that essentially only depends on topographic variations, that is, variations in the gradient of the surface.

The ratio is used to calculate the derivative of the surface according to FIG. 3F as $$f_x'(x) \approx \frac{1}{\tan\gamma} \cdot \frac{I_1(x) - I_2(x)}{I_1(x) + I_2(x)}$$

where y=the angle of incidence of the illumination, as previously. Compare also the equivalent image in the two dimensional case according to FIG. 6. In the two-dimensional case the derivative will in an equivalent way become $$f_x'(x,y) \approx \frac{1}{\tan\gamma} \cdot \frac{I_1(x,y) - I_2(x,y)}{I_1(x,y) + I_2(x,y)}$$

If the derivative is integrated, preferably with the simultaneous suppression of noise as described above, the topography is obtained according to FIG. 3G. Compare also the equivalent image in the two-dimensional case according to FIG. 7.

Figure 8:
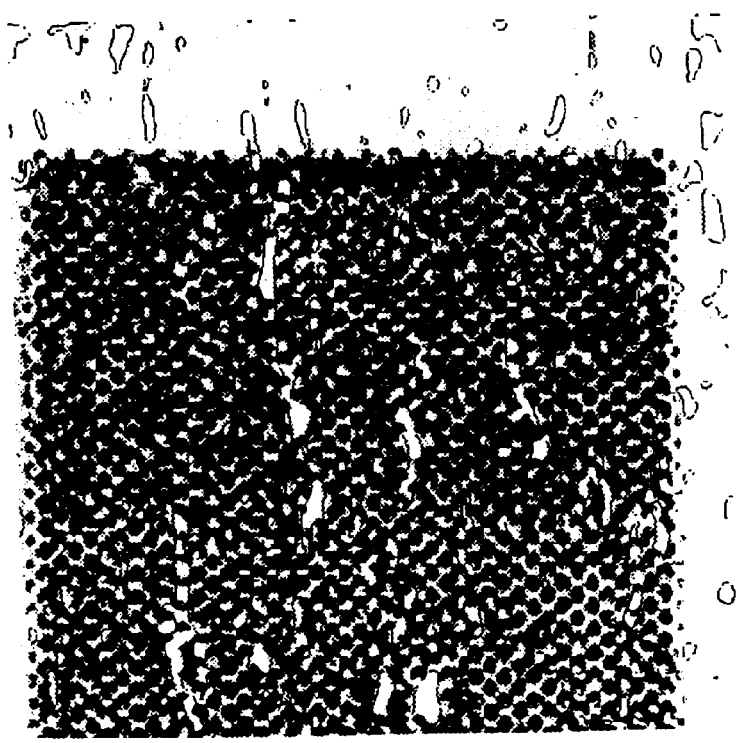
FIG. 8 shows an image of the test surface according to FIG. 4 with contours representing −1 μm.

As the previous description has made clear, in addition to the purely topographic determination (FIG. 7) of a surface, the invention can also be used for the simultaneous determination of the reflectance of the surface (FIG. 5) in the same co-ordinates. In this way, interesting relationships between surface structure and the transfer of print can be studied in detail. In FIG. 8, contours equivalent to a depth of −1 μm from a sliding reference level have been added to the reflectance image from FIG. 5 by a thresholding operation in the image processing computer 5, which explains why printed points are missing from regions of the printed area. In a similar manner, an examination has been made on the test surface according to, FIGS. 9A and 9B whether a particular depth of the depressions in the surface (for example, dark regions in the upper left-hand corner of the topographical map FIG. 9B) can correspond to failed print transfer (missing print points in FIG. 9A in those regions that are darkest in FIG. 9B). This can be used in printing technology as a prediction about in which regions missing printed points can be expected.

In this respect it has become evident that so-called straight thesholding of the topography does not work so well. On the other hand, if a high-pass filter is applied to the topographical map such that long wavelength information is suppressed, and then apply a threshold level of −1 μm, that is to say, in practice thresholding relative to a sliding reference level, then the areas that have a high probability for missing print transfer are marked, see FIG. 8. It is possible to learn from this more about how surface rawness should be measured in a manner that is relevant for printability. The method has also given interesting results for full-tone areas printed flexographic printing (not shown).

It is not necessary that the two images be recorded at different times. For example, the first image can be recorded with the arrangement described in FIG. 1 in a first wavelength region and the second image can be simultaneously recorded from the same camera point in a second wavelength region, complementary or distinct from the first wavelength region (not shown), if the two illuminations use distinct wavelength regions. In this way the possibility or recording processes on the test surface, for example, a region of a paper pathway during production, which is in motion.

Analyses according to the invention of test pieces of LWC paper have shown a high correlation, $r^2=0.95$, between profiles determined according to the invention and profiles determined according to conventional optical and mechanical methods of measuring profiles. In the diagram shown in FIG. 10, the full curve shows the profile determined according to the invention, while the dashed curve shows the same profile of the same paper strip determined by a mechanical contact method of measuring.

What is claim is:

1. A method for determining a surface illuminated by incident light by recording the intensity ($I_1(x,y)$) in light reflected from the surface in a first image thereof and by recording the intensity ($I_1(x,y)$) in light reflected from the surface in a second image thereof, taken with another angle of illumination and complementary to the first image, comprising:

recording the intensity of only diffusely reflected light over the surface in the first and second images;

determining the difference between the recorded intensities of diffusely reflected light over the surface in the first and second images in order to obtain a representation that emphasizes variations in gradient of the surface;

calculating the derivative of the area by $$f'_x(x, y) \approx \frac{1}{\tan Y} \frac{I_1(x, y) - I_2(x, y)}{I_1(x, y) - I_2(x, y)}$$

where Y is the angle of incidence of the light; and

Fourier transformation of the derivative and multiplication thereof by a Wiener filter in order to suppress noise in the recorded intensities.

2. The method according to claim 1, further comprising: normalizing the difference in order to obtain an image that is reflectance-neutral and which represents variations in gradient, that is, a derivative of the height function of the surface.

3. The method according to claim 2, wherein the difference is normalized by division by a sum ($I_1(x,y)+I_2(x,y)$) of the recorded intensities of the surface.

4. The method according to claim 3, wherein the sum ($I_1(x,y)+I_2(x,y)$) of the recorded intensities over the surface is used to obtain an essentially topographically neutral reflectance image of the surface.

5. The method according to claim 1, further comprising:
    recording the intensity of the first image with light incident from a first direction; and
    recording the intensity of the second image with light incident from a second direction that is opposite to the reflection angle of the first direction.

6. The method according to claim 1, further comprising: integrating the derivative in order to obtain the height function of the surface.

7. Use of the method according to claim 1, for determining the topography of a paper surface.

8. A method for determining a surface illuminated by incident light by recording the intensity ($I_1(x,y)$) in light reflected from the surface in a first image thereof and by recording the intensity ($I_1(x,y)$) in light reflected from the surface in a second image thereof, taken with another angle of illumination and complementary to the first image, comprising:

recording the intensity of only diffusely reflected light over the surface in the first and second images;

determining the difference between the recorded intensities of diffusely reflected light over the surface in the first and second images in order to obtain a representation that emphasizes variations in gradient of the surface; and polarizing the incident light and thereto crosswise polarization of the reflected light in order to eliminate reflections in the surface and obtain the diffusely reflected light.

9. The method according to claim 8, further comprising: normalizing the difference in order to obtain an image that is reflectance-neutral and which represents variations in gradient, that is, a derivative of the height function of the surface.

10. The method according to claim 9, wherein the difference is normalized by division by a sum ($I_1(x,y)+I_2(x,y)$) of the recorded intensities of the surface.

11. The method according to claim 10, wherein the sum ($I_1(x,y)+I_2(x,y)$) of the recorded intensities over the surface is used to obtain an essentially topographically neutral reflectance image of the surface.

12. The method according to claim 8, further comprising:
    recording the intensity of the first image with light incident from a first direction; and
    recording the intensity of the second image with light incident from a second direction that is opposite to the reflection angle of the first direction.

13. Use of the method according to claim 8, for determining the topography of a paper surface.

14. A method for determining a surface illuminated by incident light by recording the intensity ($I_1(x,y)$) in light reflected from the surface in a first image thereof and by recording the intensity ($I_1(x,y)$) in light reflected from the surface in a second image thereof, taken with another angle of illumination and complementary to the first image, comprising:

recording the intensity of only diffusely reflected light over the surface in the first and second images, wherein the first image is recorded with light in a first wavelength region and that the second image is recorded with light in a second wavelength region, distinct from the first wavelength region; and determining the difference between the recorded intensities of diffusely reflected light over the surface in the first and second images in order to obtain a representation that emphasizes variations in gradient of the surface.

15. The method according to claim 14, wherein the first image is recorded by illumination with light of a first frequency and that the second image is recorded by illumination with light of a second frequency that deviates from the first frequency.

16. The method according to claim 15, further comprising:
    recording the first and the second images simultaneously.

17. The method according to claim 14, further comprising:
    recording the first and the second images simultaneously.

18. The method according to claim 14, further comprising:
    normalizing the difference in order to obtain an image that is reflectance-neutral and which represents variations in gradient, that is, a derivative of the height function of the surface.

19. The method according to claim 18, wherein the difference is normalized by division by a sum $(I_1(x,y)+I_2(x,y))$ of the recorded intensities of the surface.

20. The method according to claim 19, wherein the sum $(I_1(x,y)+I_2(x,y))$ of the recorded intensities over the surface is used to obtain an essentially topographically neutral reflectance image of the surface.

21. The method according to claim 14, further comprising:

recording the intensity of the first image with light incident from a first direction; and recording the intensity of the second image with light incident from a second direction that is opposite to the reflection angle of the first direction.

22. Use of the method according to claim 14 for determining the topography of a paper surface.

* * * * *

UNITED STATES PATENT AND TRADEMARK OFFICE
CERTIFICATE OF CORRECTION

PATENT NO. : 6,757,065 B1
DATED : June 29, 2004
INVENTOR(S) : Per-Åke Johansson et al.

It is certified that error appears in the above-identified patent and that said Letters Patent is hereby corrected as shown below:

Column 1,
Line 21, change "lest" to -- test --.

Column 2,
Line 49, change "where αis the angle" to read -- where α is the angle --.

Column 3,
Line 26, change "(in the form of 2 mu)" to read -- (in the form of 2 π iu) --.

Column 4,
Line 15, change "where y=the angle" to read -- where γ = the angle --.
Line 41, change "according to, FIGS. 9A and 9B" to read -- according to FIGS. 9A and 9B --.

Column 5,
Line 30, change "tanY" to read -- tan γ --.
Line 33, change "where Y is the angle" to read -- where γ is the angle --.

Signed and Sealed this

Seventh Day of December, 2004

JON W. DUDAS
*Director of the United States Patent and Trademark Office*